United States Patent [19]
Borkar et al.

[11] Patent Number: 5,546,023
[45] Date of Patent: Aug. 13, 1996

[54] DAISY CHAINED CLOCK DISTRIBUTION SCHEME

[75] Inventors: Shekhar Borkar, Portland; Stephen R. Mooney, Beaverton, both of Oreg.

[73] Assignee: Intel Corporation, Santa Clara, Calif.

[21] Appl. No.: 494,486

[22] Filed: Jun. 26, 1995

[51] Int. Cl.$^6$ .................................................. H03K 19/00
[52] U.S. Cl. ........................ 326/93; 327/297; 327/293
[58] Field of Search ........................... 326/93; 327/293, 327/295, 297, 296, 165, 166, 176

[56] References Cited

U.S. PATENT DOCUMENTS

| | | | |
|---|---|---|---|
| 4,185,245 | 1/1980 | Fellinger et al. | 327/297 |
| 4,638,311 | 1/1987 | Gerety | 340/825 |
| 4,644,348 | 2/1987 | Gerety | 340/825 |
| 4,860,309 | 8/1989 | Costello | 375/17 |
| 4,939,389 | 7/1990 | Cox et al. | 326/21 |
| 4,975,605 | 12/1990 | Bazes | 327/295 |
| 5,220,211 | 6/1993 | Christopher et al. | 326/93 |

*Primary Examiner*—Edward P. Westin
*Assistant Examiner*—Richard Roseen
*Attorney, Agent, or Firm*—Blakely, Sokoloff, Taylor & Zafman

[57] ABSTRACT

A daisy chained clock distribution scheme for distributing a clock signal from a central communications clock driver to the nodes of a massively parallel multi-processor computer or supercomputer. The daisy chained clocking scheme is implemented using point-to-point clock distribution of a differential clock signal to the communication nodes of a plurality of processors in a multicomputer system or to components connected to a common bus in a high speed microprocessor system. Differential signaling is employed wherein the differentiality is maintained including through silicon. In an alternate embodiment, the clock pulse is also regenerated in each node component.

13 Claims, 3 Drawing Sheets

DAISY CHAINED CLOCK DISTRIBUTION SCHEME

BACKGROUND OF THE INVENTION

The invention relates to clock distribution schemes for supercomputers and future generation microprocessors. Presently, supercomputers predominantly employ an asynchronous communication scheme which does not require a distributed clock even though scaled to hundreds of nodes.

There are two conventional clock distribution schemes in the prior art used to distribute a clock from a central clock driver to distant nodes. The central clock signal is distributed to the nodes using (1) a stubbed network as shown in FIG. 1a, or (2) a star network as shown in FIG. 1b. In the stubbed network, a clock driver 11 feeds a clock signal to the farthest node 13 in the network, and the intermediate nodes 15 are connected in-between using taps. The star network has central clock driver(s) 21, and the clock driver(s) feeds a clock signal to each node 23 in the system using a separate net. A combination of the two schemes is also possible.

A stubbed network is easy to implement, but the quality of the clock signal distributed to the nodes is poor, resulting in clock jitter, thereby reducing the performance. Since a single clock driver feeds the clock signal to a large number of nodes, the size of the clock driver is also very large. A star network, on the other hand, may not degrade the clock signal as much, but it is difficult to layout. In this scheme as well, the clock drivers also become large, which limits the number of nodes which can be connected in this fashion.

Both prior art networks exhibit limited scaleability. As the number of nodes increases, the clock signal must be cascaded, with frequent buffering, which shrinks the clock pulse. If it is buffered too often, the clock pulse even disappears. For a given frequency of the clock, there is a limit on the number of stages of buffering which can be used before the clock pulse disappears. On the other hand, if the clock pulse is not buffered often, and the number of nodes is large, the clock signal degrades, which causes jitter and limits the performance.

For these reasons, prior art clock distribution schemes impose a practical limit on the number of nodes in a network. As it becomes desirable to build supercomputers with thousands of nodes, the prior art techniques for clock distribution are inadequate.

To obtain improved performance, the next generation of supercomputers need to use a synchronous communication scheme. Therefore a practical and reliable clock distribution scheme is essential. The next generation supercomputers will also scale to thousands of nodes, and the prior art clock distribution schemes are not adequate for this purpose.

SUMMARY OF THE INVENTION

The invention relates to techniques for distributing a clock signal from a central communications clock driver to the nodes of a massively parallel multi-processor computer or supercomputer. The invention utilizes a daisy chained clock distribution scheme to overcome the above-noted limitations of prior art clock distribution schemes. The invention allows distribution of a high frequency clock to thousands of nodes without sacrificing signal integrity or affecting the performance. This scheme is also easy to implement, and thus offers a practical solution to the clock distribution problem.

The invented daisy chained clocking scheme could be used to distribute a communication clock to the communication nodes of a massively parallel multicomputer (supercomputer). A supercomputer utilizing the invented daisy chained clocking scheme has a single high frequency central clock which is distributed to all the communication nodes to ensure synchronous operation. The synchronicity is extremely important to ensure reliability of communication, and allow the building of high performance supercomputer systems. Next generation supercomputers will have thousands of synchronous communication nodes compared to hundreds of asynchronous nodes in the present supercomputers. The scheme described here allows successful distribution of a central high frequency communication clock to the thousands of nodes, ensuring reliability and signal integrity, thereby improving the performance of the supercomputer. Additionally, as clock speeds of microprocessors increase, the successful distribution of a central high frequency communication clock will become important. The present invention can be used in this situation as well.

The invented daisy chained clocking scheme is implemented using point-to-point clock distribution of a differential clock signal to the communication nodes of a plurality of processors in a multicomputer system or to the components connected to a common bus in a high speed microprocessor system. In the invented system, differential signaling is employed wherein the differentiality is maintained including through silicon. In an alternate embodiment, the clock pulse is also regenerated in each node component.

BRIEF DESCRIPTION OF THE DRAWINGS

FIG. 4b shows a pulse generator suitable for use in the alternate embodiment of FIG. 4a.

DETAILED DESCRIPTION OF THE INVENTION

A clock distribution scheme is disclosed employing point-to-point clock distribution of a differential clock signal using a main clock signal. The differential clock signal is fed to the first node of the multicomputer system. The node uses only the rising edge of the clock signal, and generates an internal clock for its own use. The node also generates an internal differential clock pulse, approximately equal to half the clock period, and this regenerated clock is the output clock of the node. The first node's differential output clock is fed to the second node as an input clock, and so on. Thus the clock distribution is accomplished as a daisy chain of differential clock signals.

The clock signals are distributed using a point-to-point interconnection scheme; that is, there are no stubs between any clock output from a node and a clock input to a node. Point-to-point distribution of the clock signals is a key distinction over prior art techniques. As previously noted, the clock signals are differential. In this connection, although differential signaling is well known in the prior art, differential signaling by itself is not adequate for the reasons set forth below.

When the differential clock signal is buffered in the node, it is converted into a single ended signal as is done in the prior art. Thus, unless the techniques of the present invention are employed, the noise in the node is coupled to the clock signal, which ultimately propagates through the differential clock output. This results in clock jitter at the clock output of the first node, which jitter is additive as the clock signal traverses nodes. Therefore, differential signaling alone on the external clock signals limits the number of nodes that can be clocked. In the present invention, the differentiality is maintained even through the node. Since the node maintains the differential clock signal, the differential logic inside the node rejects any common mode noise generated in the node. Hence the output clock signal is substantially jitter free, and, therefore, supports scaling to a large number of nodes.

The clock signal may change its duty cycle as it traverses through the nodes, and the clock pulse could disappear after traversing a few nodes. This is a problem associated with the prior art. However, in an alternate embodiment of the invention, the clock pulse is regenerated in each node-by differential logic-to achieve a nominal duty cycle, which restores the integrity of the clock throughout the network.

Figure 1A:
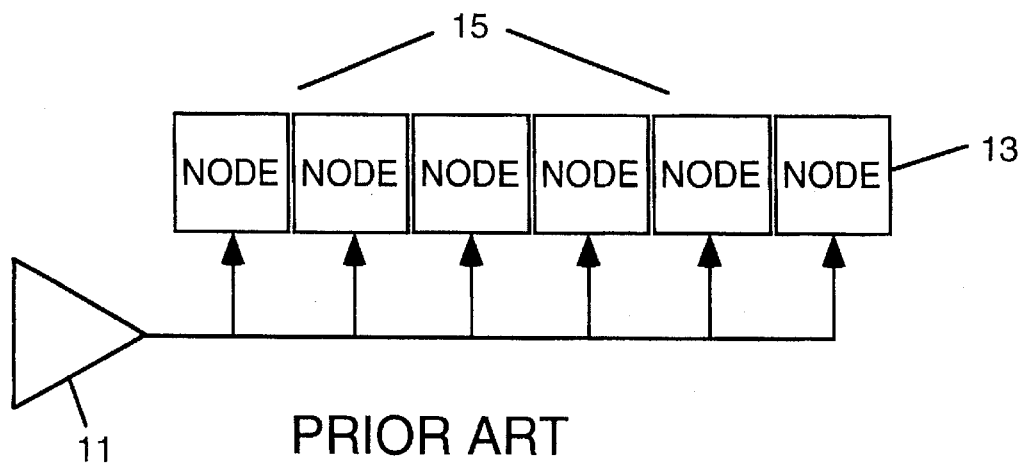
FIG. 1a shows a prior art stubbed network.
Figure 1B:
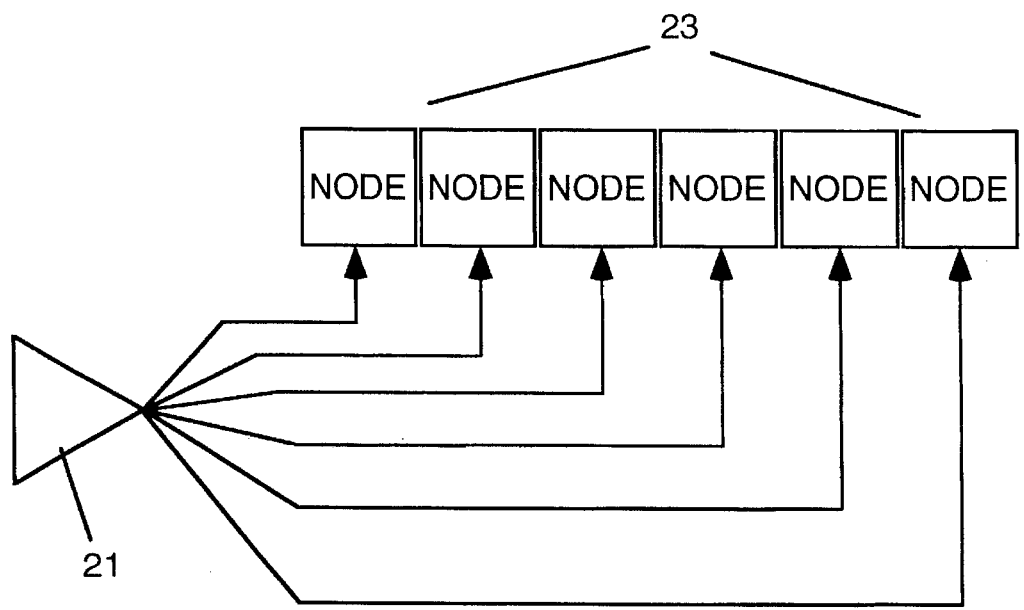
FIG. 1b shows a prior art star network.
Figure 2:
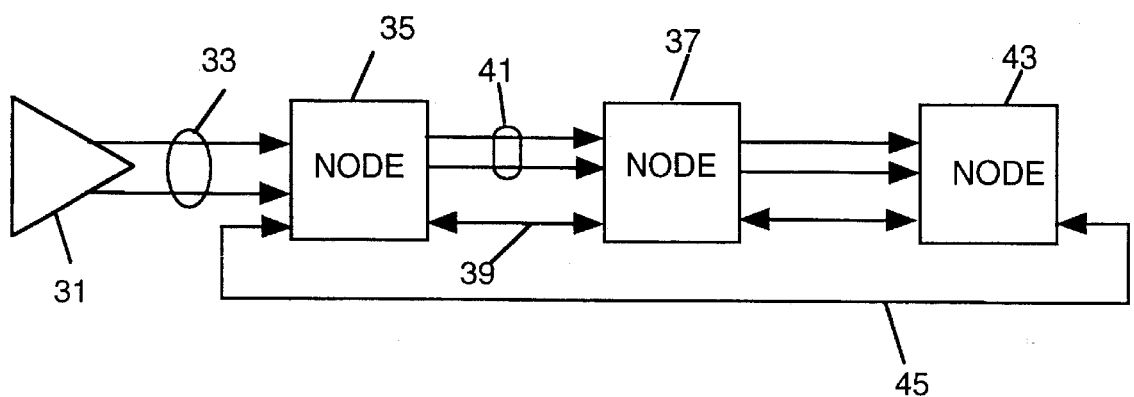
FIG. 2 shows a daisy chained differential clock distribution scheme according to the present invention.

The key elements of the invention are illustrated in FIG. 2 which shows clock driver 31 which generates a differential clock signal 33 which is input to node 35. Node 35 exchanges data with node 37 over data bus 39 and provides a differential clock signal 41 to node 37. In a similar manner, node 37 exchanges data and provides a differential clock signal to node 43. Optionally, the last node 43 and the first node 35 exchange data with each other over data bus 45. Of course, in a real world system, there would be hundreds or thousands of nodes coupled to each other in this manner. In this embodiment, duty cycle variations are not corrected for-only the differential clock is maintained between nodes. This is acceptable for nodes that only use a single edge of the clock or if the clock speed is sufficiently slow relative to total timing variations utilized in the design of the system employing the nodes.

Figure 4A:
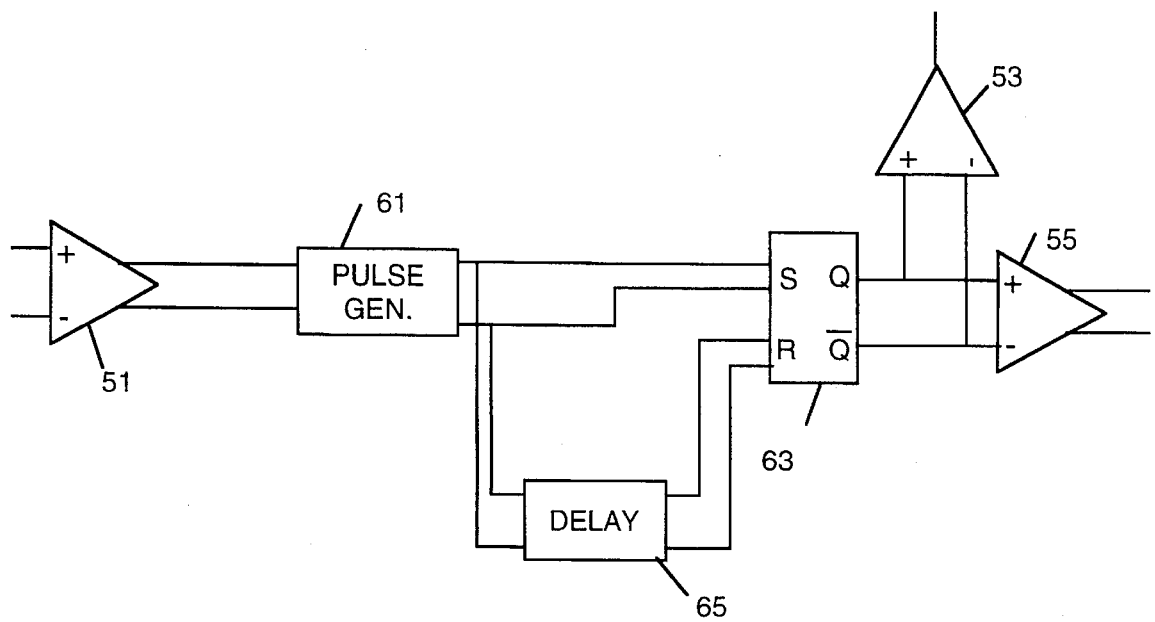
FIG. 4a shows a node used to implement an alternate embodiment of the clock distribution scheme according to the present invention.

In this connection, in an alternate embodiment, where it is important to maintain the duty cycle of the clock, each node also includes a clock generator as described below with reference to FIG. 4a.

Figure 3:
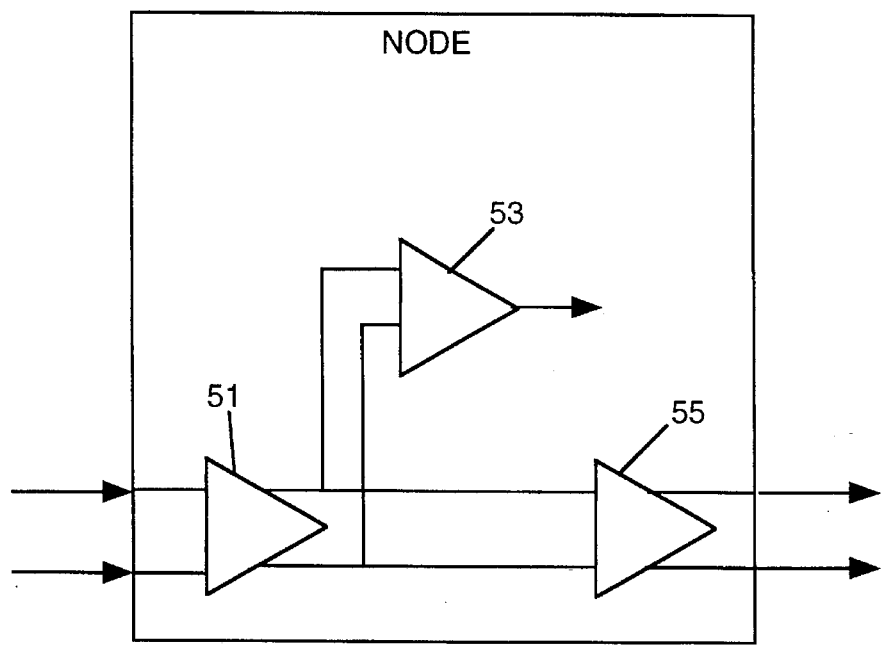
FIG. 3 shows a node used to implement one embodiment of the clock distribution scheme according to the present invention.

FIG. 3 shows the components within a single node used to implement the first embodiment of the invention. First, it should be noted that the generation of a suitable differential clock signal from a main or system clock is a well known technique employed for example in the 84201 output clock generator from Bipolar Integrated Technology, Inc. The differential clock signal is input to a differential amplifier 51 which must be implemented so that it is insensitive to power supply fluctuations. The differential clock signal output from differential amplifier 51 is input to differential amplifier 53 and differential amplifier 55. Differential amplifier 55 is implemented in the same manner as differential amplifier 51. Differential amplifier 53 is similar excepting that it is a single ended differential amplifier. The output from differential amplifier 53 is the clock signal used by the processor and other components within the node. The specifics of the implementation of differential amplifiers 51, 53 and 55 should be apparent to persons skilled in the art from this description. A commercially available part which includes a suitable differential amplifier for this purpose is available from Intel Corporation as its part no. 82385.

The invented daisy chained clock distribution scheme has application to systems having multiple processors also known as supercomputers as well as for future microprocessors running at a very high frequency of the order of 250 MHz. At that speed, the same clock distribution problems discussed above with stubbed networks and star networks will exist for such high speed microprocessors. The scheme described above can be easily applied to mainstream high speed microprocessor systems by discharging the clock through the components connected to the microprocessor memory bus.

Figure 4B:
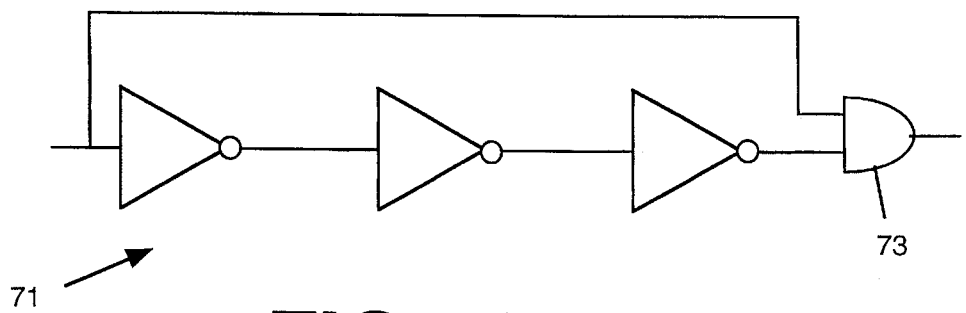

The embodiment noted above which is needed where it is important to maintain the duty cycle of the clock, wherein each node also includes a clock generator will now be described with reference to FIG. 4a which shows one possible form of a pulse correction circuit. An incoming differential signal is amplified by amplifier 51, and applied to a pulse generator 61 that generates a pulse on the rising edge of the incoming signal. One form of a pulse generation circuit 61 is shown in FIG. 4b using inverters 71 and AND gate 73. Though the pulse generator is shown as being implemented with single ended gates, it can also be built using differential logic, in order to preserve the noise rejection characteristics of the circuit. The pulse is applied to the set input of a set-reset latch 63, and a delayed version of the signal supplied by delay circuit 65 is applied to the reset input of latch 63. In this manner, the delay circuit determines the placement of the falling edge of the clock independent of the incoming waveform, thus regenerating the high phase of the clock. In order for the circuit to function properly, the width of the pulse generated by the pulse generator must be less than the delay of the delay generator. Implementation details for all elements shown in FIGS. 4a and 4b are well known in the art.

We claim:

1. A system including a network of nodes utilizing a clock driver which provides a clock signal comprising:

a) clock means for generating a differential clock signal, having a waveform, from said clock driver clock signal;

b) a plurality of nodes coupled to each other by a data bus and lines for receiving and transmitting said differential clock signal, one of said plurality of nodes having one pair of said lines coupled to said clock means;

c) each of said nodes including means for receiving the differential clock signal, first means, coupled to said means for receiving, for generating a node internal clock signal and second means, coupled to said means for receiving, for generating a node differential clock signal for output to an adjacent node, whereby said differential clock signal is point-to-point distributed to each node within said network.

2. The system defined by claim 1 wherein said clock means comprises a differential clock driver.

3. The system defined by claim 1 wherein said receiving means comprises a differential amplifier.

4. The system defined by claim 1 wherein said first means comprises a single ended differential amplifier.

5. The system defined by claim 1 wherein said second means comprises a differential amplifier.

6. The system defined by claim 1 wherein each of said nodes further comprises means, coupled to said means for receiving, for maintaining a duty cycle of the differential clock signal input to each of said nodes prior to the generation of said node differential clock signal by said second means.

7. The system defined by claim 6 wherein said duty cycle maintaining means comprises a clock generator coupled to said means for receiving.

8. The system defined by claim 7 wherein said clock generator comprises:

a) pulse generator means for generating a pulse on the rising edge of the received differential clock signal;

b) delay means for generating a delayed version of the pulse generated by said pulse generator means;

c) latch means, coupled to said pulse generator means and said delay means, for determining the placement of the falling edge of the received differential clock signal independent of the waveform of the differential clock signal input to receiving means.

9. The system defined by claim 8 wherein said pulse generator means comprises a plurality of inverters and an AND gate coupled together so that one input to the AND gate is an output of a series run of said inverters and the other input to said AND gate is the input to an initial inverter in said series of inverters.

10. The system defined by claim 8 wherein said delay means comprises a delay circuit.

11. The system defined by claim 8 wherein latch means comprises a set-reset latch.

12. A method for distributing a differential clock signal to each node in a network of nodes utilizing a central clock driver which provides a clock signal comprising the steps of:

a) generating a differential clock signal, having a waveform;

b) each of said nodes receiving the differential clock signal, generating a node internal clock signal and generating a node differential clock signal for output to an adjacent node, wherein said node internal clock signal and said node differential clock signal are output in response to said differential clock signal, whereby said differential clock signal is point-to-point distributed to each node within said network.

13. The method defined by claim 12 further comprising the steps of:

a) generating a pulse on the rising edge of the received differential clock signal;

b) generating a delayed version of the pulse generated by said pulse generating step;

c) determining the placement of the falling edge of the received differential clock signal independent of the waveform of the received differential clock signal based on the pulse and the delayed version of the pulse.

* * * * *